Figure 7:
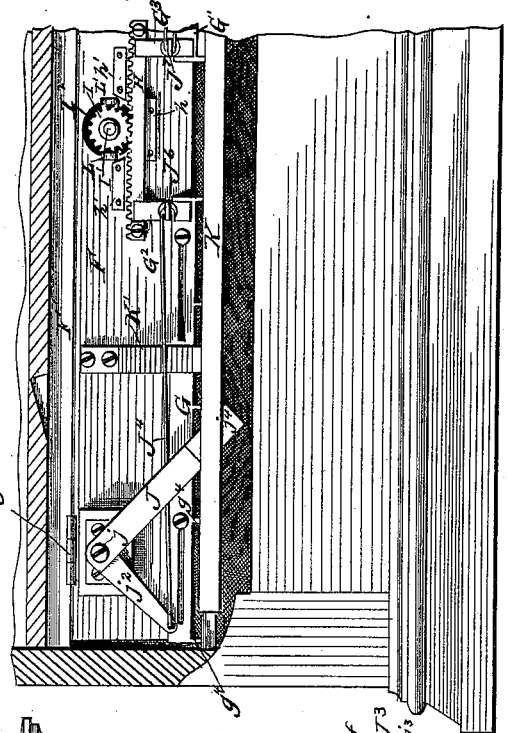

(No Model.) 6 Sheets—Sheet 1.
W. H. H. KNIGHT.
SPOOL CABINET.
No. 564,153. Patented July 14, 1896.
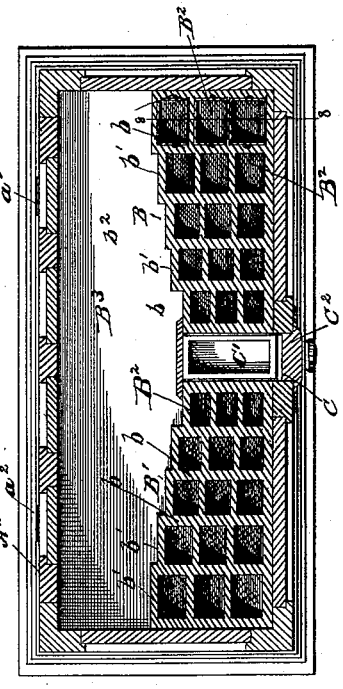
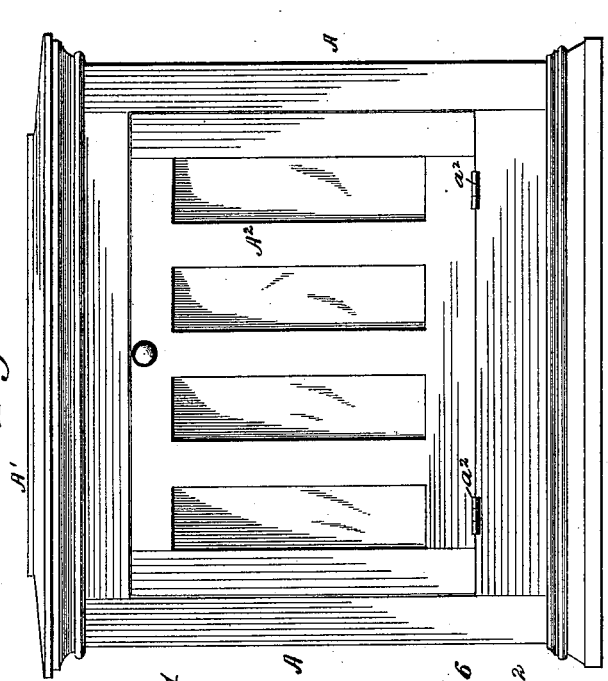
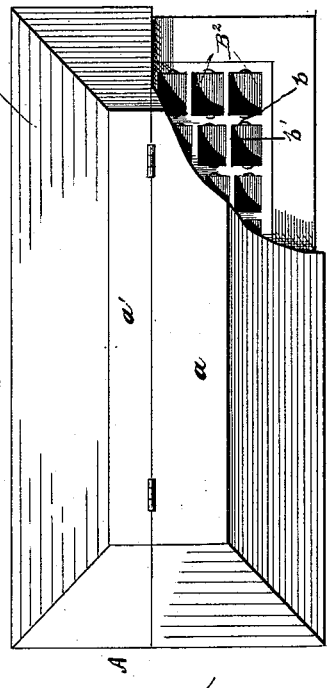
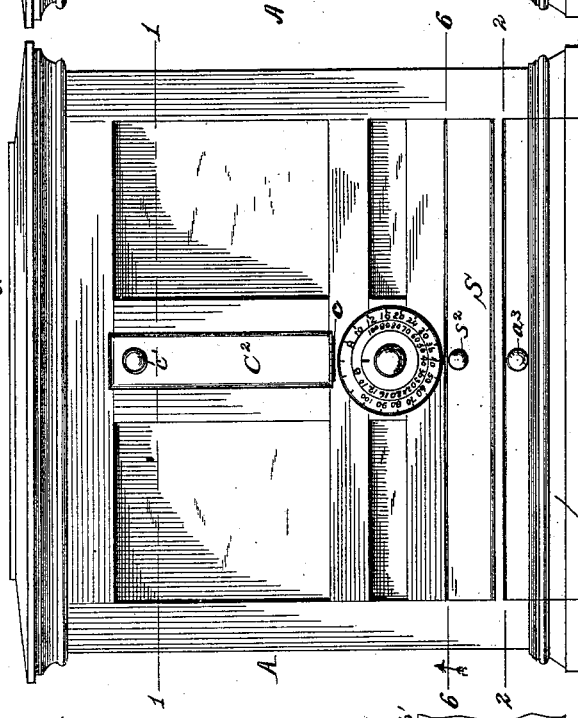
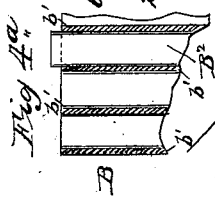
Witnesses:
W H Mathews
G M Knight
Inventor:
W. H. H. Knight (No Model.) 6 Sheets—Sheet 2.
W. H. H. KNIGHT.
SPOOL CABINET.

No. 564,153. Patented July 14, 1896.

Witnesses:
W H Mathews
G M Knight

Inventor:
Wm H. H. Knight

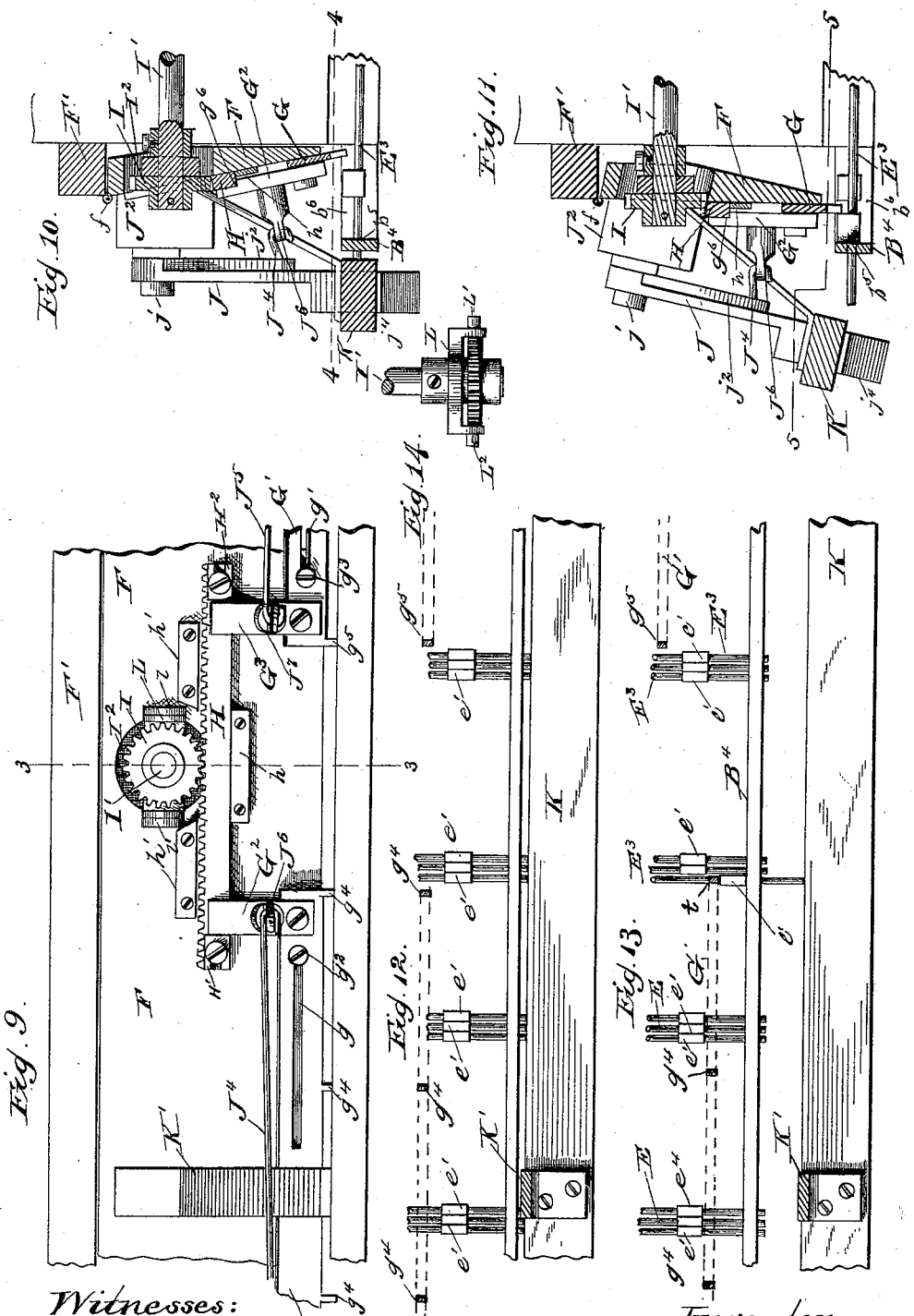

(No Model.) 6 Sheets—Sheet 4.
W. H. H. KNIGHT.
SPOOL CABINET.
No. 564,153. Patented July 14, 1896.
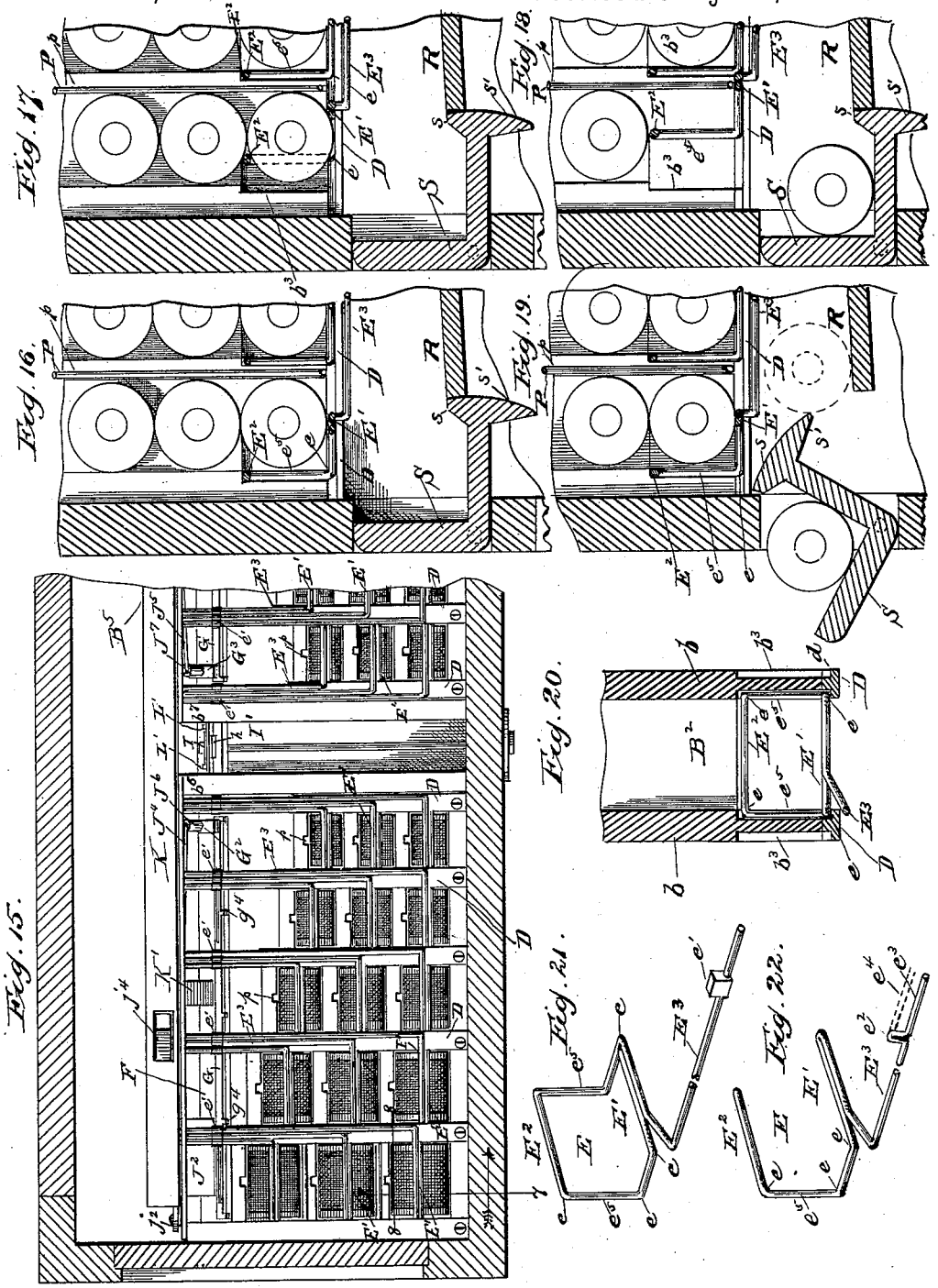
Witnesses:
W. H. Mathews
G. M. Knight
Inventor:
Wm. H. H. Knight
THE NORRIS PETERS CO., PHOTO-LITHO., WASHINGTON, D. C.

(No Model.)
W. H. H. KNIGHT.
SPOOL CABINET.
No. 564,153.   Patented July 14, 1896.
6 Sheets—Sheet 5.
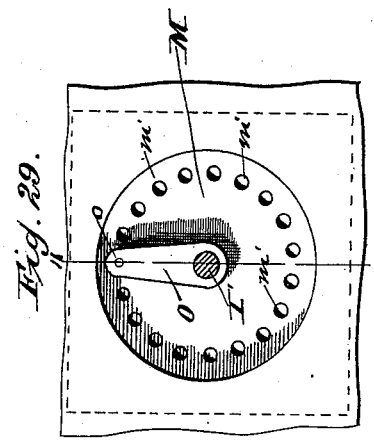
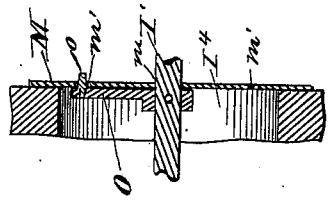
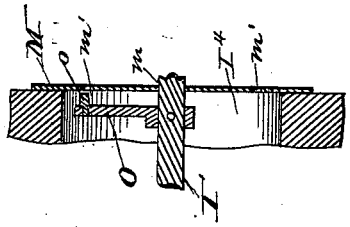
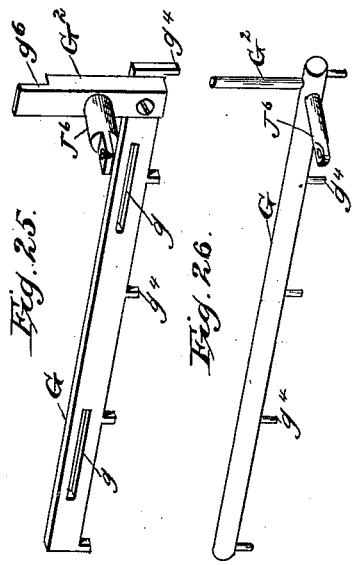
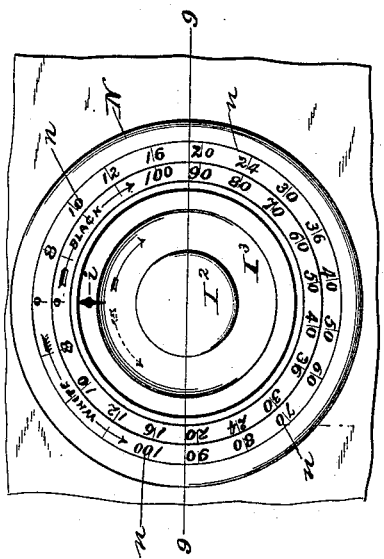
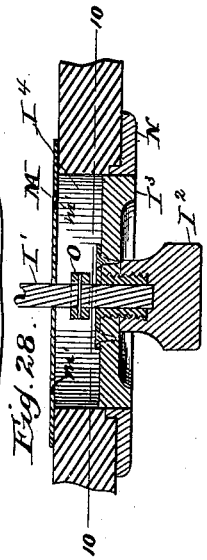
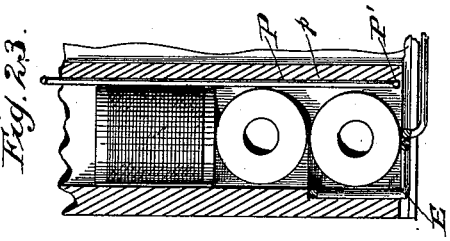
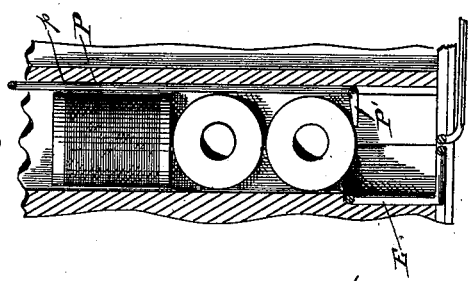
Witnesses:
W H Mathews
G M Knight
Inventor:
Wm H. H. Knight (No Model.) 6 Sheets—Sheet 6.
W. H. H. KNIGHT.
SPOOL CABINET.
No. 564,153. Patented July 14, 1896.
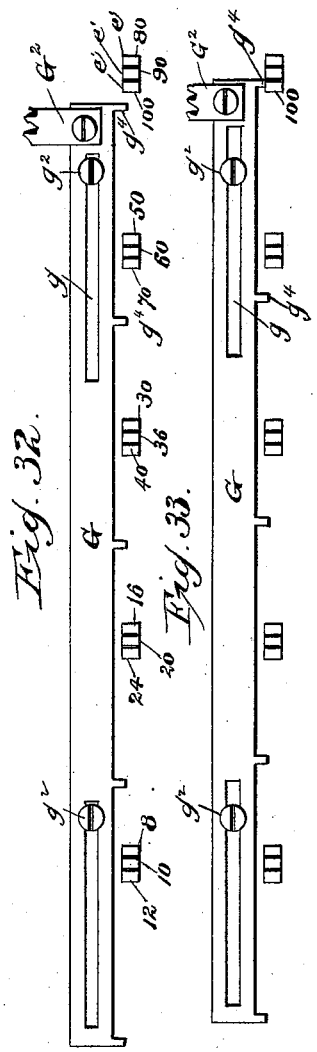
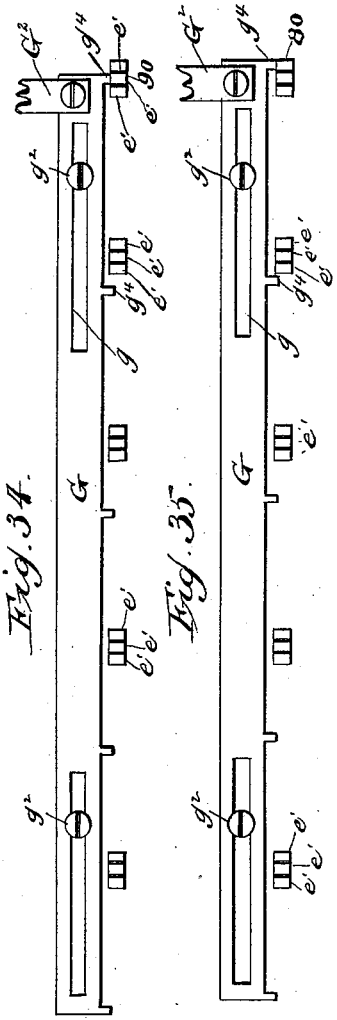
Witnesses:
Inventor:
Wm. H. H. Knight
THE NORRIS PETERS CO., PHOTO-LITHO., WASHINGTON, D. C.

UNITED STATES PATENT OFFICE.

WILLIAM H. H. KNIGHT, OF WASHINGTON, DISTRICT OF COLUMBIA, ASSIGNOR OF ONE-THIRD TO NEVIN B. LE FEVRE, OF LITTLESTOWN, PENNSYLVANIA.

SPOOL-CABINET.

SPECIFICATION forming part of Letters Patent No. 564,153, dated July 14, 1896.

Application filed April 15, 1896. Serial No. 587,678. (No model.)

*To all whom it may concern:*

Be it known that I, WILLIAM H. H. KNIGHT, a citizen of the United States, residing at Washington, in the District of Columbia, have invented certain new and useful Improvements in Spool-Cabinets; and I do hereby declare the following to be a full, clear, and exact description of the invention, such as will enable others skilled in the art to which it appertains to make and use the same.

My invention relates, in general, to the class of cabinets; but more particularly it contemplates the provision of a device of the class named, the which is especially designed for and adapted to be employed to hold spools of thread of the various denominations, and is provided with means whereby a spool of thread of any desired denomination may be readily and quickly withdrawn from the cabinet without the trouble and annoyance usually experienced when using the ordinary spool-cabinet, in which the various denominations of spools are packed in a single drawer, and are consequently liable to become mixed together, thus causing both loss of time and temper to the person who may be seeking for any particular number or denomination of said spools.

To the above-named end my invention consists in an inclosing case having separate compartments or pockets, each adapted to receive a number of spools of a single denomination, mechanism for normally holding said spools within said compartments or pockets and for permitting the passage of but a single spool from said compartments when operated, a single key or button common to all of said compartments or pockets, and means for connecting such key or button with the spool-dropping mechanism of any desired one of said compartments to move the same.

The invention further consists in the provisions of means, independent of the spool-dropping mechanism, whereby each compartment or pocket may be readily and quickly emptied of its spools without using said spool-dropping mechanism.

The invention further consists in a cabinet provided with the spool holding and dropping mechanism hereinbefore referred to, and with means whereby it may at will be used as a writing-desk, and, finally, the invention consists in the construction, arrangement, and combination of the several parts comprised therein as a whole, substantially as is hereinafter described, and illustrated in the accompanying drawings, wherein—

Figure 8:
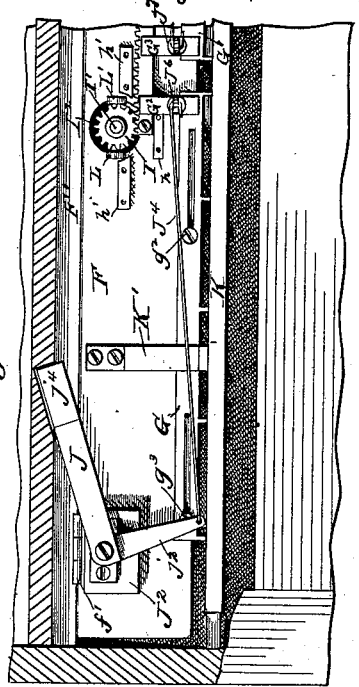
Figure 6:
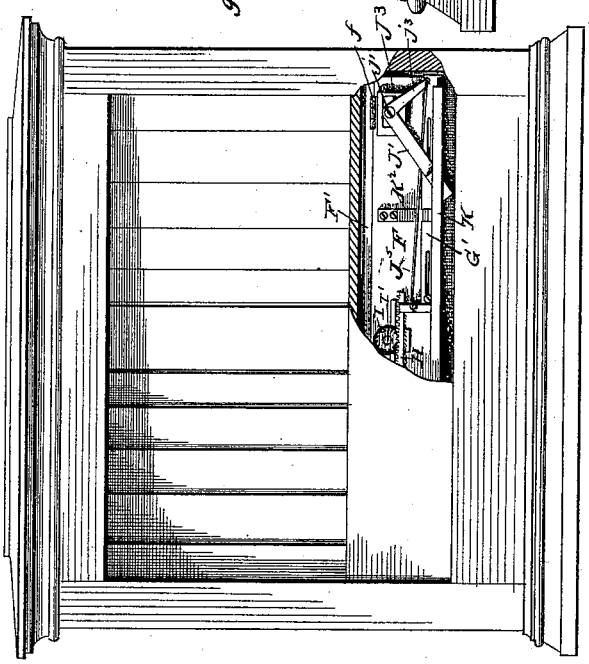
Figure 5:
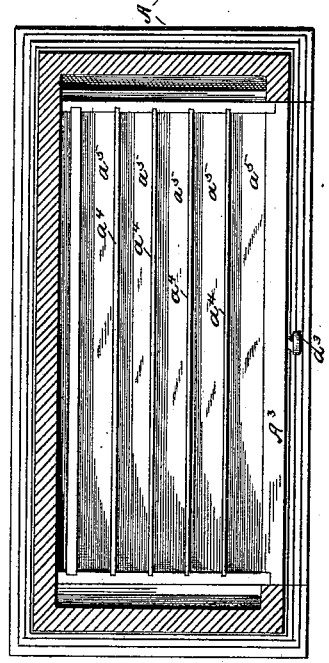

Figure 1 is a front elevation of my improved spool-holding cabinet. Fig. 2 is a rear elevation thereof. Fig. 3 is a top plan view, partly broken away, to show the spool-holding compartments below. Fig. 4 is a horizontal section taken on the line 1 1 of Fig. 1 to show the arrangement of the spool-holding compartments or pockets. Fig. 4$^a$ is a sectional elevation on the line 8 8 of Fig. 4 to show removable pockets. Fig. 5 is a horizontal section taken on the line 2 2 of Fig. 1 to show the drawer or receptacle for fancy-colored thread. Fig. 6 is a rear elevation of the cabinet, the desk-leaf removed and the interior lining broken away to show part of the spool-dropping mechanism. Fig. 7 is an enlarged detail view of parts of the spool-dropping mechanism shown in Fig. 6, showing the same as it appears when at rest. Fig. 8 is a detail view of the parts shown in Fig. 7 and shows said parts as they appear when moved to drop a spool. Fig. 9 is an enlarged detail view of part of the mechanism shown in Figs. 7 and 8. Fig. 10 is a transverse sectional view taken on the line 3 3 of Fig. 9 and shows in addition parts of the spool-dropping mechanism not shown in said Fig. 9. The figure shows the several parts as they appear when at rest. Fig. 11 is a view of the parts shown in Fig. 10, showing said parts as they appear when moved to operate the spool-dropping slides or valves. Fig. 12 is a plan view of parts of the mechanism shown in Fig. 10, taken in the line 4 4 of said Fig. 10. Fig. 13 is a similar view of said parts, taken on the line 5 5 of Fig. 11. Fig. 14 is a top plan view of the yoke that supports the inner end of the spool-dropping-mechanism operating-shaft detached from the device. Fig. 15 is a transverse sectional view taken on the line 6 6 of Fig. 1 and shows, when looking in the direction indicated by the arrow, the bottoms of the spool-holding compartments. Figs. 16 to 19, inclusive, are enlarged sectional views taken on the line 7 7 of Fig. 15 through one of the spool-holding compartments to show the different positions assumed by the spool-dropping valve or slide when a spool is being withdrawn from the cabinet, and said figures show in addition parts of the operating mechanism not shown in Fig. 15. Fig. 20 is an enlarged sectional view taken on the line 8 8 of Fig. 15 to show the position of the spool-dropping slide in spool-holding compartments. Fig. 21 is a detail perspective view of one of the spool-dropping slides detached from the cabinet. Fig. 22 is a similar perspective view of a modified form of the slide shown in Fig. 21. Figs. 23 and 24 are detached detail sectional views taken through one of the spool-holding compartments to show one method of removing spools from said compartments independently of the spool-dropping slides. Fig. 25 is a detail perspective view of dropping-slides-operating bar detached from the cabinet. Fig. 26 is a modified form of said operating-bar. Fig. 27 is a detached detail view in elevation of the single button or key which operates the spool-dropping mechanism, together with its setting-dial. Fig. 28 is a transverse sectional view of the parts shown in Fig. 27, taken on the line 9 9 of said figure. Fig. 29 is a sectional view of the parts shown in Fig. 28, taken on the line 10 10 of said latter figure, to clearly show the means employed to hold the spool-slide-operating bar in proper contact with said spool-slides. Figs. 30 and 31 are vertical sections taken on the line 11 11 of Fig. 29 to show the different positions assumed by the bar-holding mechanism. Figs. 32 to 37, inclusive, are diagrammatic elevations illustrating the different positions assumed by the spool-slide-operating bars when the device is being operated. Figs. 38 and 39 represent modified forms of the dial shown in Fig. 27.

Similar letters of reference in the several figures of the drawings denote similar parts.

Although in the present application for Letters Patent I have in the drawings, which form a part of this specification, and shall hereinafter describe my invention solely in its adaptation for use in connection with the black and white spool-cotton of commerce, of which variety there are, as is well known, some fifteen denominations or numbers of each color, I yet do not wish or intend to limit or restrict its use to such variety of thread alone, for, as will be readily apparent from the hereinafter-contained description, the invention is equally applicable for use in connection with any and every style and description of spool-thread, whether of silk, linen, or cotton.

In the present adaptation of my invention I employ an inclosing case A, which may be of the form shown herein, or of any other desired form and style, and provide said case with a top or cover A', part of which, $a$, is hinged to the remaining part $a'$, (which latter is secured to the case,) whereby to gain access at will to spool-holding compartments or pockets B B', hereinafter described.

I preferably make the rear side $A^2$ of the case A in such manner that it may be utilized as a writing leaf or desk, for which purpose I hinge said side $A^2$, at $a^2$, to the case A, so that when opened outward with its upper edge resting upon the surface which supports the case A it shall have the proper angle, as regards said case, to form a convenient desk. If desired, however, the leaf or side $A^2$ may be connected at its side edges to the body of the case A in any desired manner to attain the end set forth above.

I provide the case A, in its lower portion or base, with a drawer $A^3$, operated by a pull $a^3$, and I divide the interior of said drawer by partitions $a^4$ into compartments $a^5$ to receive fancy-colored spools of thread, or for receptacles for extra spools of black and white thread, as may be desired.

B B' designate two series of cells, compartments, or pockets, which are formed by longitudinal and transverse partitions $b\ b'$ to receive, the one black, the other white, spools of thread, respectively.

By reference to the drawings, Fig. 4, it will be observed that the cells or pockets $B^2$ of each of the series B B' vary in size in cross-area, such variation for the purpose of accommodating different sizes of spools, as will be readily understood. It will also, from the same figure, be observed that the combined series of pockets or cells B B' occupy but about one-half of the interior space of the case A, and that a space $B^3$, which is closed at the bottom by a horizontal partition $b^2$, is left between said cells or pockets B B' and the side $A^2$, the which space may be utilized, either in connection with said leaf $A^2$ as a desk, or for the storage of extra spools of thread, as may be desired.

C designates a space formed between the series of cells or compartments B B', the which may be utilized in various ways. In the present instance I have shown said space as provided with drawers C' and closed at the front by a flap $C^2$, which is hinged at $c$ to the case, and is provided with a pull $c'$, as shown.

I provide the longitudinal partitions $b$ of each of the series B B' of cells or compartments at the bottom thereof with suitable ways or guides D, which are provided at their lower side edges with projecting flanges $d$, that support slides E, one of which latter is arranged at the lower end of each spool-holding compartment or cell $B^2$ to hold spools within said cells, and to permit the withdrawal of said spools singly therefrom, when desired.

The slides E may have various forms of construction. I have, however, found the form illustrated in Fig. 21 to possess special fitness for the purpose intended. In this form, of which I show a modification in Fig. 22, I make the slide E of a single piece of wire, bending the same upon itself at the points $e$ to form a cross-bar $E'$, upon which the spools of thread normally rest when the device is not in operation, (see Fig. 16,) and a second cross-bar $E^2$, upon which the spools temporarily rest when the device is being operated, to withdraw a spool from the cells or compartments. (See Fig. 18.)

From the body portion of the spool-slide E, above described, the wire projects rearwardly, as shown at $E^3$, and is provided at a short distance from its end with a short upwardly-projecting block $e'$, through which said slide receives motion from the slide-operating bar, as will be presently explained.

In lieu of the block $e'$ the part $E^3$ may be bent upwardly, as shown at $e^2$, Fig. 22, and thence extend to its end in the planes shown respectively by full lines $e^3$ and by dotted lines $e^4$.

In practice I make the bodies of the slides E somewhat longer than the width of the cells or pockets $B^2$, so that the bars $E'$ $E^2$ of said slides extend fully across from side wall to side wall of said cells or pockets, (see Fig. 20,) and thus permit a spool, when being withdrawn from said cells or pockets, to pass freely between the side portions $e^5$ of the slides, as is clearly shown in Fig. 17. To accommodate the increased length of the slides E over the width of the cells or pockets $B^2$, as set forth above, I provide the lower ends of said cells or pockets with recessed portions $b^3$ $b^4$, into which the bodies of the slides project, (see Figs. 16 to 20, inclusive,) and in which they are movably held and supported by the flanges $d$ of the guides D, as shown in the figures last above referred to.

By reference to the drawings it will be observed that the spool-holding cells or pockets are arranged in groups of three, from front to rear, and that the rearwardly-projecting portions $E^3$ of the slides E of each of said group of cells or pockets extend in juxtaposition to each other from their respective cell or pocket to and through openings $b^5$, which are formed in supporting-bars $B^4$ $B^5$, that are secured to supports $b^6$ $b^7$, projecting from the lower portions of the series of pockets B B', respectively. (See Figs. 10 to 13, inclusive; also Fig. 15.) By this arrangement of the portions $E^3$ of the slides E, I am enabled to mass the blocks $e'$ (through which the slides receive motion) closely together, and thereby to attain results important to this art, as will be hereinafter set forth.

F designates a flap which extends from side to side of the cabinet, and is hinged at $f$ $f'$ to a cleat or ledge $F'$, which is secured to the back of the spool-holding cells or pockets B B', near the bottom thereof. The flap F has a limited swinging motion, as indicated by Figs. 10 and 11, for a purpose hereinafter to be described.

G G' designate bars, which operate the spool-dropping slides E, and which I provide with slots $g$ $g'$ to receive screws or bolts $g^2$ $g^3$, which movably connect said bars G G' to the swinging flap F at its lower edge and at opposite sides of the center of said flap. (See Figs. 7, 8, and 9.) I provide the bars G G', upon their bottom edges, with downwardly-projecting fingers or spurs $g^4$ $g^5$, that contact with the blocks $e'$ of the slides E when the latter are to be moved.

I preferably so space the spurs or fingers $g^4$ $g^5$ upon the bars G G', as regards the distances between the blocks $e'$, that only one of said spurs or fingers is in operation at any one time, as is clearly illustrated in Figs. 32 to 37 and hereinafter described.

I provide the bars G G', at their inner adjacent ends, with upwardly-projecting arms $G^2$ and $G^3$, and provide the upper end of each of said arms, upon its rear surface, with a recessed portion $g^6$ to receive a rack-bar H, which is adapted to be moved in guides $h$ $h'$ upon the flap F by a pinion I, which is mounted upon the inner end of the operating-shaft $I'$, and operated in manner hereinafter set forth.

I provide the opposite ends of the rack-bar H, upon its outer surface, with stop-blocks H' $H^2$, which are normally in contact with the arms $G^2$ $G^3$ when the device is not in operation, (see Figs. 7 and 9,) and which serve to impart motion to the bars G G' through the arms $G^2$ $G^3$ when the rack-bar H is moved to the right or to the left to operate the spool-slides. (See Fig. 8.)

It will be understood that the rack-bar H is not secured to either of the arms $G^2$ $G^3$, but rather rests and slides freely in the recessed portions $g^6$ of said arms.

To maintain the bars G G' at their full outward limit of movement, (see Figs. 6 and 7,) which is their normal position when not in operation, and also to return the said bars to such normal position, I provide the opposite ends of the flap F with bell-crank levers J J', the which I preferably pivot at $j$ $j'$ to supports $J^2$ $J^3$, which project from said flaps F, for a purpose hereinafter to be explained.

I connect the bell-crank levers J J' with the bars G G' through rods $J^4$ $J^5$, which extend from the arms $j^2$ $j^3$ of said levers to studs $J^6$ $J^7$, that project from the arms $G^2$ $G^3$, as shown.

I provide the opposite longer arms of the bell-crank levers J J' with weights $j^4$ sufficient to overbalance and move the bars G G' and rack-bar H into their normal position after they have been operated to move a spool-slide.

To return the spool-slides E to their normal position after the same has been moved to drop a spool, I employ a bar K, which extends from side to side of the cabinet in juxtaposition to and parallel with the spool-slide-supporting bars $B^4$ $B^5$, and which normally impinges against the outer ends of said slides, as shown in Fig. 12. I rigidly connect said bar K, by brackets K' K², with the swinging flap F, to be moved thereby, as will be hereinafter set forth.

To operate the spool-dropping mechanism hereinbefore described, I provide a pinion I, which moves the rack-bar H, and which is rigidly secured upon the rear end of a shaft I', that extends from front to back of the device, and is journaled at or near said pinion I in a swinging bracket L, supported by trunnions L' L², which project from said bracket in the plane of the pinion I (see Fig. 14) and enter lugs $l\ l'$, that are rigidly secured to the flap F at the opposite sides of an opening I², which is formed through said flap F to accommodate said pinion. The opposite forward end of the shaft I' is journaled and moves freely through an opening $m$, formed in a plate M, that is secured to the front of the cabinet, preferably upon the inner side thereof. (See Figs. 15, 30, and 31.)

I provide the shaft I', upon its forward end, with a button I², by which the said shaft is operated, and which is provided with a circular disk I³, that moves freely within a circular opening I⁴, formed through the front of the cabinet. (See Fig. 28.) I provide the disk I³, upon its outer surface, with an indicating-point $i$, for a purpose presently to be explained.

N designates a thin ring-shaped dial that surrounds the disk I³ and is provided with numerals $n$, that correspond with the numbers or denominations of spools within cabinet and indicate the extent to which the button is to be turned when it is desired to withdraw a spool from said cabinet, as will be presently explained.

To insure the correct operation of the device, when the indicator $i$ of the disk I³ has been turned to either of the numerals $n$ of the dial N to withdraw a spool from the cabinet, I provide the plate M with a series of apertures $m'$, which are arranged concentric with the central opening $m$ of said plate, are equal in number to the spaces on the dial which contain the numerals, and are adapted to be entered by a spur $o$, which projects inwardly from an arm O, that is rigidly secured upon the shaft I' within the opening I⁴ of the front. (See Figs. 30 and 31.)

I provide the cabinet, below the spool-holding pockets or compartments B B', with an inclined shelf or table R, upon which the spools fall from said pockets, and by which they are directed to and into a tilting drawer S, that is pivoted at its opposite ends to the case A within an opening formed through the front of the case for that purpose. (See Figs. 1 and 16 to 19, inclusive.)

I provide the tilting drawer S, at its rear upper edge, with a ledge $s$ to retain spools within said drawer. I also provide said drawer, at its rear lower edge, with a depending flange $s'$, the purpose of which is to prevent spools from passing under the drawer when open, as shown in Fig. 19. I provide the drawer S with a suitable pull $s^2$, by which it is operated.

To remove spools from either of the pockets or compartments B² for any reason and without operating the spool-slides E, I provide said pockets or compartments at one side, with grooves $p$, in which I arrange rods P, which have their lower ends turned to form hooks P', which normally lie within recesses formed in the pockets for that purpose, and which are adapted to be turned outward below the spools when said spools are to be withdrawn from the pockets or compartments. (See Figs. 23 and 24.)

In Fig. 26 I show a modified form of the spool-slide-operating bar G, which consists in providing an ordinary bar, of suitable metal, with downwardly-projecting fingers, corresponding with the teeth $g^4$ of the bar G, herein described, and with upwardly and laterally-projecting arms, corresponding with the arms G² and J⁶, respectively, of said bar G, said fingers and arms of wire.

In operation the several pockets or compartments B² of each series B B' are first filled with their appropriate denomination or numbers of spool-cotton, the white thread occupying one of said series, and black the other, and each of said series having its particular numerals indicated on the dial N, as shown in Fig. 27.

When it is desired to withdraw a spool from the cabinet, the button I² is turned toward the series B or B' occupied by the color desired, and until the indicating-point $i$ of the disk I³ is opposite the numerals of spool to be withdrawn. By the rotation of the button the bar G or G', as the case may be, will be moved through the rack-bar H, pinion I, and shaft I' (upon which the button is secured) until the finger $g^4$ of such bar G or G' is opposite the block $e'$ on the spool-slide E of the pocket or compartment occupied by the spool desired, as shown at $t$, Fig. 13. The button I² is now pressed to swing the flap F and its contained mechanism outward, (through the shaft I', see Fig. 13,) and thus move the slide to drop the spool. (See Figs. 16 to 19, inclusive.) On releasing the button from pressure the flap F will be, by the weight of the bell-crank levers J J', returned to its normal position, and will, through its attached bar K, return the slide E into position to be again operated. At the same time said bell-crank levers J J' will return the bar G or G' to its normal position of rest.

By reference to Fig. 31 it will be seen that the shaft I', when pressed to drop a spool, is held from rotation by the engagement of the pin $o$ on the arm O with one of the apertures $m'$ of the plate M, and that the finger $g^4$ of the bar G or G' is thus held in proper relation with the spool-dropping slide until the latter has been returned to its normal position.

When released from the compartments B², the spool drops to the incline R and drawer S, and is thence removed from the cabinet.

As hereinafter stated, I do not limit or confine the device herein described solely to use in connection with ordinary black and white cotton thread, for it will be readily seen that the device is equally well adapted for use in connection with any and all kinds of thread when spooled, nor do I limit or confine myself to the exact construction of parts as shown herein, but rather claim any and all modifications of such parts as shall properly fall within the spirit and intent of my invention.

In Fig. 38 of the drawings I show a modified form of dial to be used when the device is to be employed solely in connection with colored thread of various shades. In this form I divide the perimeter of said dial into as many parts as there are colors to be used, as red, blue, &c., and divide each of said parts into as many spaces as there are shades of said main colors, each of said parts and spaces having their proper names or numbers, as shown.

In Fig. 4ª I show a removable casing or lining to the compartments B², which may be removed, filled with spools, and replaced in such compartment B² or in suitable guides, which may hold it (such casing or lining) in proper position.

In Fig. 39 I show the dial rigid with the shaft I' to turn therewith.

Having thus described my invention, I claim and desire to secure by Letters Patent—

1. In a spool-holding cabinet, an inclosing case, a series of independent pockets or compartments within said case to receive spools, valves or slides to close said pockets or compartments, an independent bar to contact with and operate said valves or slides, and means substantially as described, independent of said bar to move the same into contact with any desired one of said valves or slides to operate the same, as and for the purpose specified.

2. In a spool-holding cabinet, an inclosing case, a series of independent pockets or compartments within said case to receive spools, valves or slides to close said pockets or compartments, a single independent key or button, and means substantially as described independent of said key or button, to connect said key or button, with any desired one of said valves or slides to move the same, as and for the purpose set forth.

3. In a spool-holding cabinet, an inclosing case, independent pockets or compartments within said case to receive spools, valves or slides to close said pockets or compartments, a bar independent of said valves or slides to be moved into contact with any desired one thereof, and a single key or button independent of said bar to move the same into contact with any of said valves or slides, to operate the latter, substantially as described.

4. In a spool-holding cabinet, an inclosing case, independent pockets or compartments within said case to receive spools, valves or slides to close said pockets or compartments, a bar independent of said valves or slides to be moved into contact therewith to operate the same, a key or button independent of said bar to move the same in one direction and connections independent of said key or button to return said bar to its normal position, substantially as described.

5. In a spool-holding cabinet, an inclosing case, a series of independent pockets, or compartments within said case, to receive spools, valves or slides to close said pockets or compartments, an independent bar having fingers to contact with said valves or slides, a single key, or button to positively move said bar, in one direction into contact with said valves or slides, and a bell-crank lever to return said bar to its normal position, substantially as described.

6. In a spool-holding cabinet, an inclosing case, a series B, and a series B', of independent pockets, or compartments, to receive spools, valves or slides to close said pockets, or compartments, an independent slide-working bar to each of said series B, and B', a single key, or button, and connections between said key, or button and each of said bars, to move them positively in one direction, and oppositely-arranged bell-crank levers, to return said bars to their normal position, substantially as described.

7. In a spool-holding cabinet, an inclosing case, a series of independent pockets, or compartments within said case, to receive spools, valves or slides to close said pockets or compartments, a bar having fingers to contact with said valves or slides to move the same, a single key, or button, having a rack-and-pinion connection with said bar to positively move it in one direction, and a bell-crank lever to return said bar to its normal position, substantially as described.

8. In a spool-holding cabinet, the combination of a single independent key or button having a rotary movement to move an independent bar into contact with spool-dropping valves or slides, and a reciprocating movement to move said bar laterally to operate said slides or valves with said independent bar, valves or slides to be moved by said bar, and independent spool-holding pockets or compartments closed by said valves or slides, substantially as descrbed.

9. In a spool-holding cabinet, the combination of an independent bar having irregularly-spaced fingers projecting therefrom, with regularly-spaced abutting blocks connected to spool-dropping valves or slides to be contacted by said fingers; spool-holding pockets or compartments, valves or slides closing the same, and a single key or button independent of said bar connected to move said bar to operate said valves or slides, substantially as described.

10. The combination in a spool-holding cabinet of independent pockets or compartments to receive spools, with valves or slides having rigidly-connected spool-retaining portions E', E², extending transversely of the spool-holding pockets or compartments, to engage adjoining spools when said spools are to be moved, a bar independent of said valves or slides to move the same, and mechanism substantially as described independent of said valves and bar to move the latter into position to operate said valves, as and for the purpose set forth.

11. In a spool-holding cabinet, a spool-dropping valve or slide E, having rigidly-connected transverse portions E', E², extending in separate planes to contact with adjoining spools, a space between said portions E', E², to permit the passage of a spool, a projecting portion E³, connected to said transverse portions E', E², and a contact-block e', upon said part E³, in combination with a spool-holding compartment or pocket, an independent slide-operating bar, and mechanism substantially as described to move said bar into connection with said valve to operate the latter, as and for the purpose set forth.

12. In a spool-holding cabinet, an inclosing case, a series of independent pockets, or compartments within said case, to receive spools and slides or valves to close said pockets, or compartments, in combination with a flap, common to said pockets, or compartments, and hinged thereto, to swing thereon, longitudinally-moving bars upon said flap, and mechanism substantially as described to move said bars longitudinally into contact with said slides, and said flap, and said bars outwardly to move said slides, as and for the purpose specified.

13. In a spool-holding cabinet, an inclosing case, a series of independent pockets, or compartments within said case to receive spools, and valves or slides to close said pockets, or compartments, in combination with a flap, hinged to said pockets, or compartments, oppositely-moving bars, carried by said flap, to contact with said valves or slides, mechanism substantially as described, to move said bars longitudinally upon said flap, into contact with said slides, and to swing the flap and bars outwardly, to move said slides, and a bar K, common to said slides, and rigidly connected to said flap, to return said slides to their normal position, as and for the purpose specified.

14. In a spool-holding cabinet, an inclosing case, a series of independent pockets, or compartments within said case, to receive spools, valves or slides to close said pockets, or compartments, a flap hinged to said pockets, and provided with longitudinally-moving bars G, and G', to contact with said valves or slides, in combination with a rack-bar, carried by said flap, to move said bars G, G', a pinion carried by the button-shaft, and a swivel connection between said shaft, and said flap, to maintain the pinion in engagement with the rack-bar, when the flap is swung outward to move the slides, substantially as described.

15. In a spool-holding cabinet, a series of independent pockets to receive spools, and spool-dropping slides to close the delivery end of said pockets, with rods P, at one side of said pockets, independent of the spool-dropping slides, said rods having their lower ends bent at angles to be moved into, or out of contact with spools in said pockets, to remove spools from said pockets when desired, substantially as described.

16. In a spool-holding cabinet, a series of independent pockets, or compartments to receive spools, slides to close said pockets, a hinged flap having longitudinally-moving bars to contact with said slides, a single operating key, or button having a rotary movement, to move said bars into contact with said slides, and a longitudinal movement to swing said bars outward to move said slides, connections between said key, or button and said bars, and a locking device to hold said bars positively in engagement with any desired one of said slides, substantially as described.

17. In a spool-holding cabinet, the combination of independent pockets to receive spools, slides to close said pockets, bars independent of said slides to contact with and operate said slides, a single operating-key or button-shaft independent of said bars and slides, and having a rotary movement and a reciprocating movement, to move said bar into contact with a slide, and said slide to drop a spool, with an arm O, rigid with said key-shaft to turn therewith a pin o, projecting from said arm, and a plate M, rigid with the casing, and having apertures m', to receive said pin o, to hold the key-shaft from rotation when the same has been pressed to drop a spool, substantially as described.

18. In a spool-holding cabinet, independent pockets to receive spools, slides to close said pockets, an independent bar to be moved into contact with said slides to operate the same, a single key or button shaft independent of said slide-operating bar and having a rotary movement, and a reciprocating movement, and connections between said shaft and said bar to move the latter and operate a slide, in combination with indicating devices, substantially as described, connected with said key-shaft to determine the rotation thereof, and a locking device to hold said key-shaft at any desired point of rotation, as and for the purpose specified.

In testimony whereof I have affixed my signature in presence of two witnesses.

WILLIAM H. H. KNIGHT.

Witnesses:
HENRY E. COOPER,
H. S. KNIGHT.